(12) United States Patent
Minina et al.

(10) Patent No.: US 11,797,651 B2
(45) Date of Patent: *Oct. 24, 2023

(54) SYSTEMS AND METHODS FOR MAPPING LICENSES DATA FROM DISPARATE DATABASES

(71) Applicants: Darya Minina, Edgewater, NJ (US); Mikhail Minin, Edgewater, NJ (US)

(72) Inventors: Darya Minina, Edgewater, NJ (US); Mikhail Minin, Edgewater, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,370

(22) Filed: Jul. 14, 2022

(65) Prior Publication Data
US 2022/0350865 A1   Nov. 3, 2022

Related U.S. Application Data

(63) Continuation-in-part of application No. 17/075,717, filed on Oct. 21, 2020, now Pat. No. 11,423,125, which is a continuation of application No. 15/908,801, filed on Feb. 28, 2018, now Pat. No. 10,817,591, which is a continuation of application No. 14/464,623, filed on Aug. 20, 2014, now abandoned.

(51) Int. Cl.
*G06F 21/10* (2013.01)
*G06F 16/23* (2019.01)
*G06F 16/24* (2019.01)
*G06F 16/25* (2019.01)

(52) U.S. Cl.
CPC .......... *G06F 21/105* (2013.01); *G06F 16/23* (2019.01); *G06F 16/24* (2019.01); *G06F 16/252* (2019.01)

(58) Field of Classification Search
CPC ........ G06F 21/105; G06F 16/23; G06F 16/24; G06F 16/252
USPC ........................................... 726/26
See application file for complete search history.

(56) References Cited

U.S. PATENT DOCUMENTS

| | | | | |
|---|---|---|---|---|
| 5,862,223 A * | 1/1999 | Walker | ................ | H04N 21/812 705/50 |
| 2010/0114711 A1 * | 5/2010 | Hudson | ................ | G06Q 50/01 705/14.66 |

* cited by examiner

*Primary Examiner* — Anthony D Brown

(57) ABSTRACT

A system and method for mapping licenses from disparate data sources and databases from third parties triggered by a system registration request, analyzing data structures for license information records and third-party information records, cross-referencing a license record with a third-party information record, flagging database records that reflect a license field record change, updating mapping-related procedures and queries, and providing a presentation of license information records and related status.

20 Claims, 9 Drawing Sheets

FIG. 15

SEARCH

Search Nail Technician by: ⟵1501

| State | Alaska ▼ |
| Zip code | |
| Last Name | |
| Specialty | Tips ▼ |

Specialty (drop down menu)

Results: ⟵1502

| Name | License | Profile link | [#Likes] | Disinfection procedure verified |
|---|---|---|---|---|
| Jane Smith | 123abcd56 | Y | 27 | Y |
| Sandra Day | 14xyz12345 | | 1 | N |

FIG. 16

Search 1601

- Enter or Select Fields 1602

Display 1603

| Name 1604 | Services 1606 | Stars 1608 | Awards 1610 | Link 1611 | Location 1612 |
| License Number 1605 | Specializations 1607 | | Represented 1609 | | Language 1613 |

FIG. 17

List 1701

- Access 1702
- Create 1703
- Edit 1704

SYSTEMS AND METHODS FOR MAPPING LICENSES DATA FROM DISPARATE DATABASES

PRIORITY CLAIM

This application is a continuation of and claims the benefit of priority of U.S. Non-Provisional application Ser. No. 17/075,717, filed Oct. 21, 2020, which in turn is a continuation of and claims the benefit of priority of U.S. Non-Provisional application Ser. No. 15/908,801, filed Feb. 28, 2018, now patent Ser. No. 10/817,591, which in turn is a continuation of and claims the benefit of priority of U.S. Non-Provisional application Ser. No. 14/464,623, filed Aug. 20, 2014. The above referenced applications are incorporated in their entirety as if restated in full.

BACKGROUND

Field of the Invention

The present invention relates generally to a disparate data sources and databases records processing system.

Description of the Related Art

Professional records reside in disparate data sources and databases with varying data structures and formats that are difficult to access and process accurately and efficiently. Therefore, there is a need to provide an automated and accurate system and method for mapping licenses data from professional records from disparate data sources and databases from third parties triggered by a system registration request by accurately analyzing data structures of third-party information records. Often, professional record changes are not updated and tracked on a regular basis and records requirements are not closely tracked. Therefore, there is a need for flagging database records that reflect a license field record change, updating mapping-related procedures and queries, and providing a presentation of professional records information and related status.

SUMMARY

An aspect of some embodiments of the invention provides methods and systems for mapping licenses from disparate data sources and databases from third parties triggered by a system registration request, analyzing data structures for license information records and third-party information records, cross-referencing a license record with a third-party information record, flagging database records that reflect a license field record change, updating mapping-related procedures and queries, and providing a presentation of license information records and related status.

An aspect of some embodiments of the invention provides methods and systems for mapping licenses from disparate data sources of third-parties, including storing a plurality of professional information records, wherein each professional information record is triggered by a registration attempt with an intermediary licensing verification system, receiving from a third-party a plurality of third-party information records, wherein each third-party information record relates to licensing data, and wherein the third-party includes a government agency or a certification body, cross-referencing a professional information record with a third-party information record, providing the professional information record including status and an indication of being licensed, tested or verified and permitting an end user to edit the professional information record including reporting a violation or complaint.

BRIEF DESCRIPTION OF THE DRAWINGS

FIG. 15 is a diagram illustrating an example interface of one or more aspects of an IDP system or method, according to an embodiment of the invention.

FIG. 16 is a diagram illustrating an example interface of one or more aspects of an IDP system or method, according to an embodiment of the invention.

FIG. 17 is a diagram illustrating an example interface of one or more aspects of an IDP system or method, according to an embodiment of the invention.

The figures depict various embodiments of the present invention for purposes of illustration only. One skilled in the art will readily recognize from the discussion herein that alternative embodiments of the structures and methods illustrated herein may be employed without departing from the spirit and scope of the invention.

DETAILED DESCRIPTION

The following detailed description of various embodiments of the present invention will be made in reference to the accompanying drawings. In describing the present invention, explanation about related functions or constructions known in the art are omitted to avoid obscuring the present invention with unnecessary detail.

Figure 1:
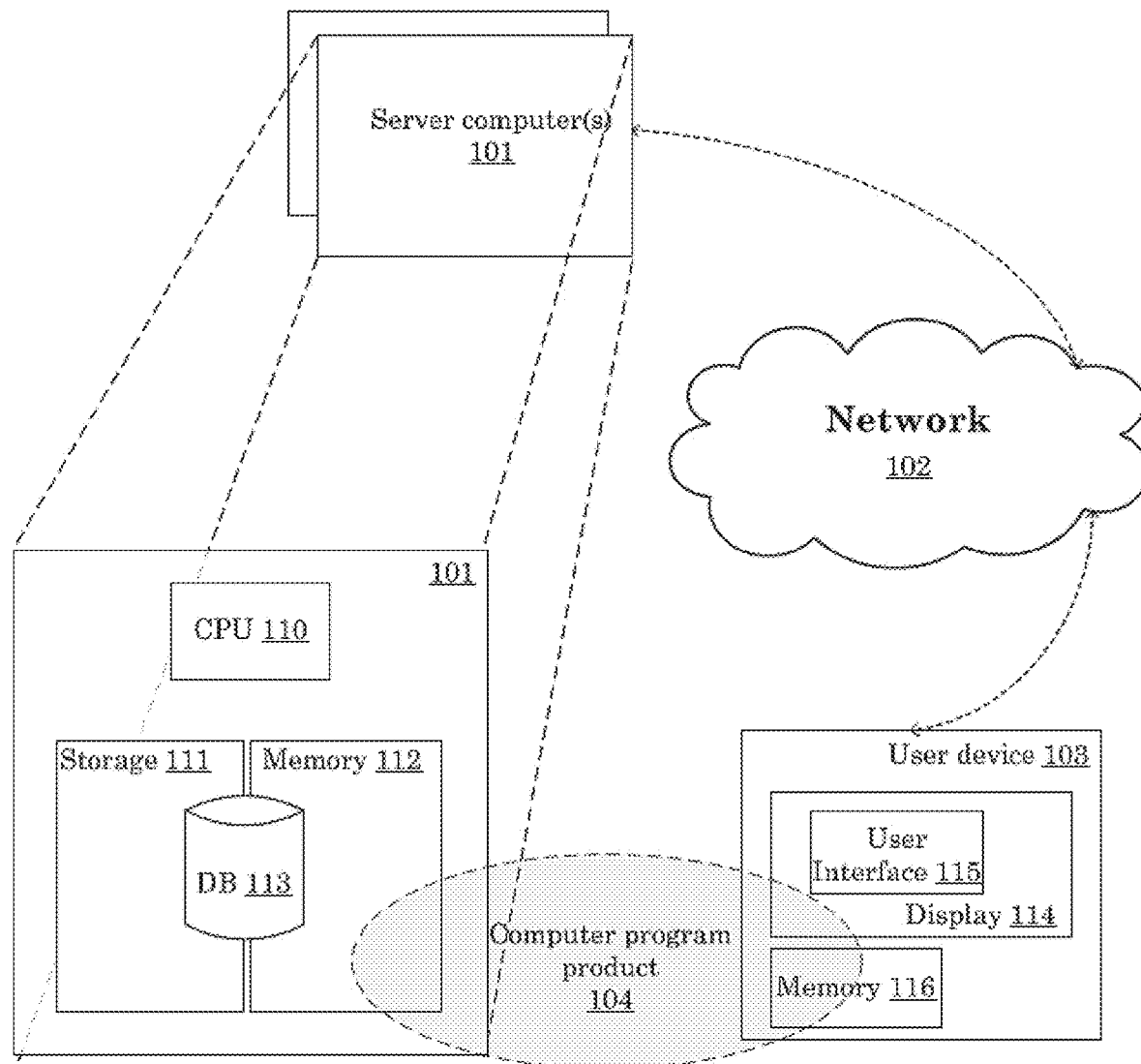
FIG. 1 is a block diagram illustrating an example distributed computer system that can implement one or more aspects of an Interactive Directory of Professionals (IDP) system or method, according to an embodiment of the invention.

FIG. 1 is a block diagram illustrating an example distributed computer system 100 that can implement one or more aspects of an Interactive Directory of Professionals (IDP) system or method, according to an embodiment of the invention. Not all of the components may be required, and variations in the arrangement and type of the components may be made without departing from the spirit or scope of the invention.

As illustrated in FIG. 1, the distributed computer system 100, according to an embodiment of the invention includes one or more server computers 101, network 102, user device 103 and computer program product 104. The one or more servers 101 include central processing unit (CPU) 110, storage 111, memory 112, and database (DB) 113.

The DB 113 may include a database of professionals, such as an IDP database, stored on, accessible by, or communicating with a server 101, and accessible via a user device 103, such as a computer, mobile device, or other means connected to the internet, which can be accessed by a user, via a user interface 115, provided on the display 114 coupled to user device 103.

The DB 113 may include a single category or group of professionals, such as beauticians, or encompass several related categories of professionals, such as hairstylists and cosmetologists, or be a general accessible storage for any number of categories or groups of professionals, such as service professionals, service providers, trade professionals, licensed or certified professionals or service provider or the like.

Although not illustrated, additional components may be utilized, for example, one or more local area networks (LANs)/wide area networks (WANs), one or more wireless networks, one or more wired or wireless client devices, mobile or other wireless client devices. Some of the user devices may include, for example, desktop computers, laptop computers, set top boxes, tablets, cell phones, smart phones, etc. The servers can include, for example, one or more application servers, content servers, search servers, database servers, or the like.

User device 103 includes display 114, user interface 115, and memory 116. Display 114 may be implemented as a touch screen display but is not limited thereto.

Server computer 101 includes central processing unit (CPU) 110, storage 111, memory 112 and database (DB) 113. Server computer 101 may be any computing device capable of hosting computer product 104 for access by one or more client computers, for example user device 103, over a network such as the Internet, for example network 102. Server computer 101 communicates with one or more client computers via the Internet and may employ protocols such as the Internet protocol suite (TCP/IP), Hypertext Transfer Protocol (HTTP) or HTTPS, instant-messaging protocols, or other protocols.

Memory 112 and 116 may include any known computer memory device. Storage 111 may include any known computer storage device.

Although not illustrated, memory 112 and 116 and/or storage 111 may also include any data storage equipment accessible by the server computer 101 and user device 103, respectively, such as any memory that is removable or portable, (e.g. flash memory or external hard disk drives), or any data storage hosted by a third-party (e.g. cloud storage), and is not limited thereto.

DB 113 may reside in both memory 112 and storage 111 to provide optimized seek time and response time. In some implementations, a database such as DB 113 does not necessarily need to be separately maintained. In some implementations, a user-side database for the IDP system and methods may be maintained in addition to DB 113.

User device 103 and the server computer(s) 101 access and communicate via the network 102. Network 102 includes a wired or wireless connection, including a Wide Area Networks (WANs) and cellular networks or any other type of computer network used for communication between devices.

According to some aspects of an embodiment of the invention, an IDP system or method may be implemented on user device 103 and server computer 101 by computer program product 104. Specifically, computer program product 104 includes instructions for executing the IDP method and system on server computer 101 and user device 103 and the instructions are stored on computer readable memory 112 and memory 116, respectively. Computer program product 104 includes instructions to present an IDP on the interface 115 and to execute instructions for carrying out related IDP methods described further herein. In some embodiments, portions of computer program product 104 are distributed across multiple servers and devices. In some embodiments, computer program product 104 is implemented only on server computer 101.

User device 103 may be implemented as a desktop computer or a portable device such as a mobile phone, smart phone, multi-media player, e-reader, tablet/touchpad, notebook, laptop personal computer (PC), smart watch, and head mounted display ("HMD"), or other communication devices, and is not limited thereto.

Although not illustrated, user device 103 may also include a processor, an input and output subsystem, a wireless transceiver, a database, and one or more input interfaces including a touch enabled display, a trackball, keyboard, microphone, and the like.

One or more server computers 101 may include, for example, one or more advertiser computers, search engine computers, content provider computers, broadcasting provider computers, web servers, application servers and the like.

Figure 2:
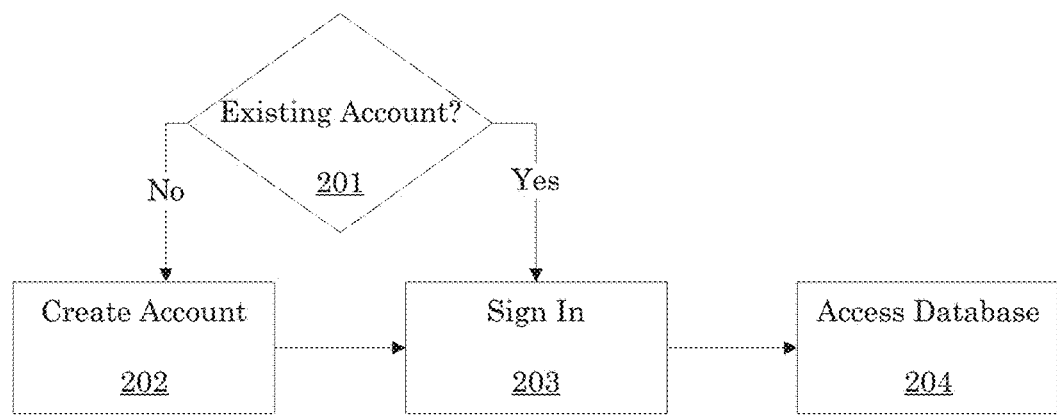
FIG. 2 is a flow diagram illustrating example operations of one or more aspects of an IDP system or method, according to an embodiment of the invention.

FIG. 2 is a flow diagram illustrating example operations of one or more aspects of an IDP system or method, according to an embodiment of the invention. According to some aspects of an embodiment of the invention, for example as illustrated in FIG. 2, if the user has an existing account in step 201, it may be necessary for the user to sign in in step 203 before accessing the database in step 204.

Before signing in, in step 203, the user may be required to create an account in step 202.

Figure 3:
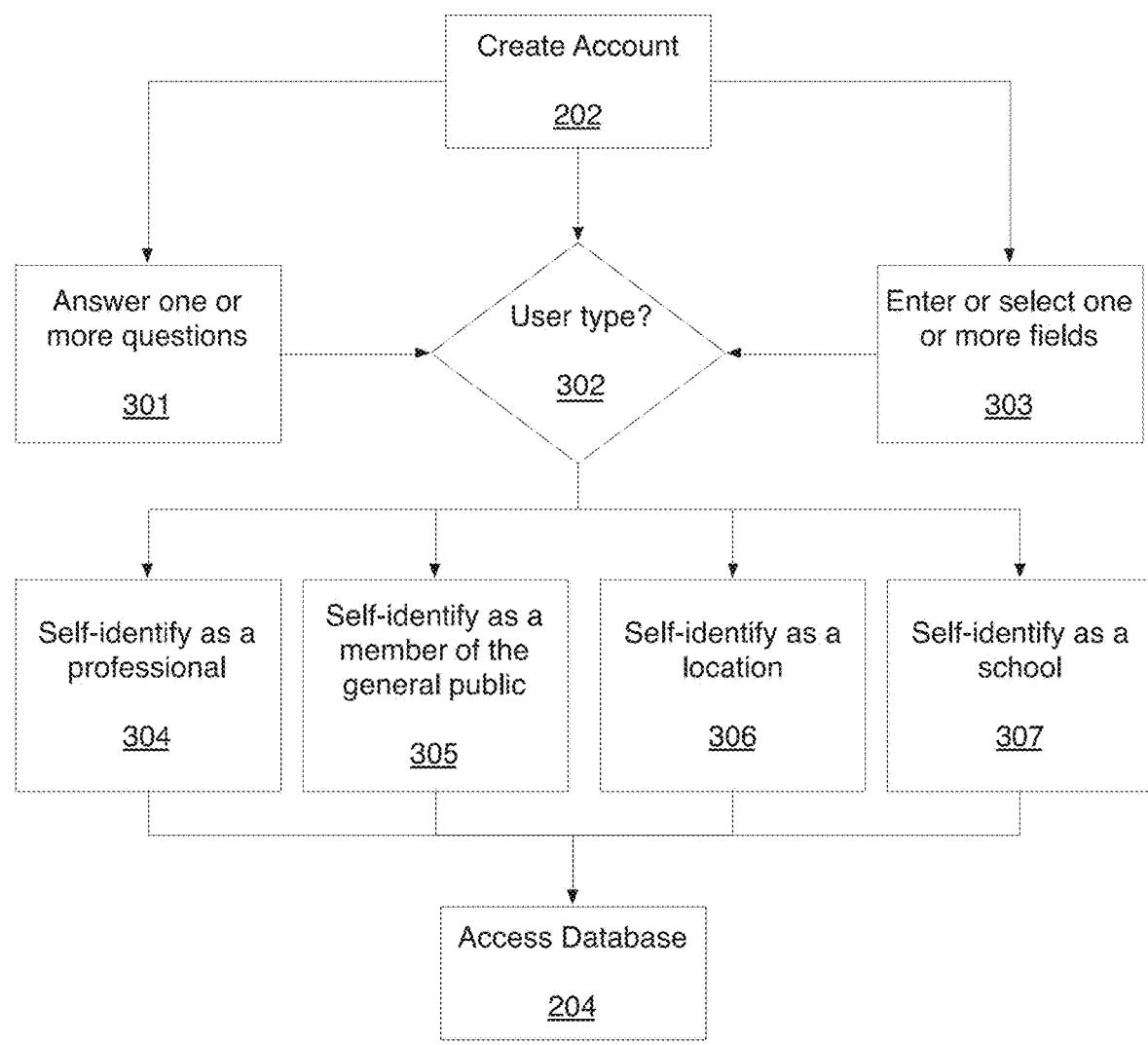
FIG. 3 is a diagram illustrating an example interface of one or more aspects of an IDP system or method, according to an embodiment of the invention.
Figure 4:
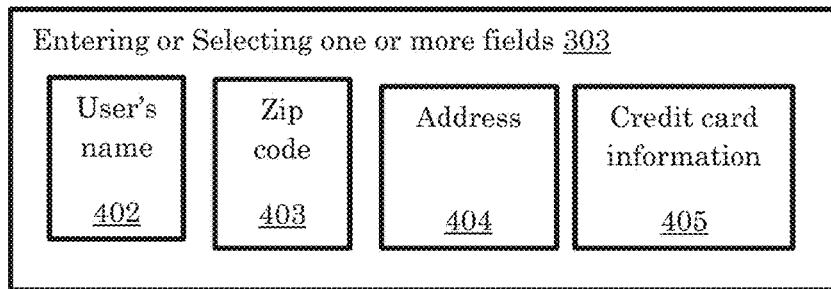
FIG. 4 is a diagram illustrating an example interface of one or more aspects of an IDP system or method, according to an embodiment of the invention.

FIGS. 3 and 4 are diagrams illustrating an example interface of one or more aspects of an IDP system or method, according to an embodiment of the invention. According to some aspects of an embodiment of the invention, for example, as illustrated in FIGS. 3 and 4, creating an account in step 202 may require the answering of one or more questions in step 301 relating to a user's involvement and/or experience in a particular profession or service, such as "How often do you get a pedicure?" or "Do you prefer your hair straightened or curled?", and/or the entering or selecting of one or more fields in step 303, such as the user's name 402, zip code 403, address or part of an address 404, and/or credit card information 405, as illustrated in FIG. 4. The answers to these questions and the fields selected or entered may appear on the user's profile, which may be visible either publicly, privately, or in only to other users who share some common feature with the user, such as a zip code, being listed on one or more lists. The visibility of a profile may depend on user settings, website settings, or privacy settings provided by an end user or a third-party.

In lieu of requiring the user to sign in, the user interface may automatically log a user in based on cookies indicating that the user has already created an account and has not signed out. Additionally, or in the alternative, the user interface may prompt a user to log in after a certain period of inactivity on the site and log him or her out if he or she does not log in after a second period of time of inactivity. According to some aspects of an embodiment of the invention, the user may be able to passively look through the site without modifying or contributing to the database or attributes of the database.

According to some aspects of an embodiment of the invention, for example, as illustrated in FIG. 3, the user may be required or able to self-identify a user type in step 302, to self-identify as a professional in step 304, during the creation of the user profile, for example, when creating an account in step 202. Alternatively, the user may self-identify as a professional by editing the user profile after the profile has already been created. Alternatively, the user can self-identify as a member of the general public 305 either during the creation of the user account, profile, or after one of them has already been created. Alternatively, the user can self-identify as a location 306 where the professionals work, such as a salon, or a place of business, or the like. Alternatively, the user can self-identify as a location or school 307 where the professionals are trained, such as a cosmetology school. After completion of creation of the profile, and self-identifying in steps 304-307, the user may access the database in step 204. Additionally, the IDP system or method may verify the user information before providing access to the database. The verification may be via checking user information through a third party, such as a licensing body or agency, or a background checking agency, based on user information, for example a user name or license number.

Figure 5:
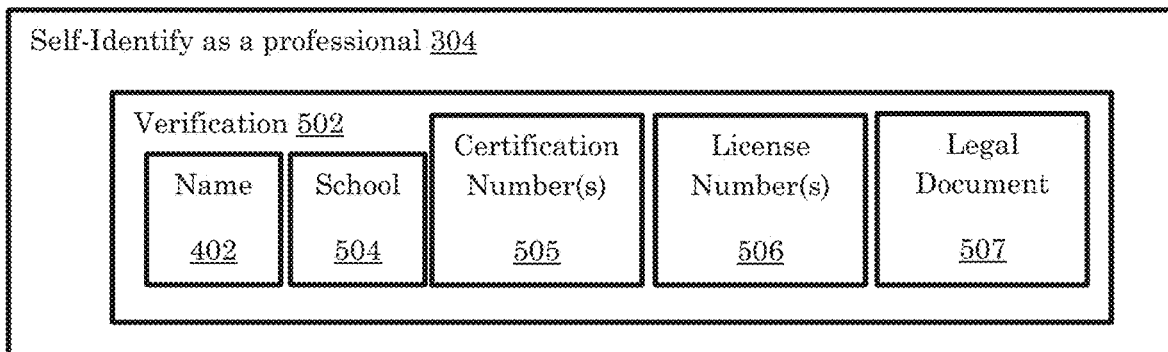
FIG. 5 is a diagram illustrating an example interface of one or more aspects of an IDP system or method, according to an embodiment of the invention.

FIG. 5 is a diagram illustrating an example interface of one or more aspects of an IDP system or method, according to an embodiment of the invention. According to some aspects of an embodiment of the invention, for example, as illustrated in FIG. 5, before accepting a self-identification as a professional 304, the user interface may require one or more forms of verification 502 that the user has been certified, for example, by entering the user name 402, the school 504 from which the user graduated, and/or a municipal, state, federal, or associative certification number 505 and/or license number 506. According to some aspects of an embodiment of the invention, verification includes the signing of a legal document 507 that the user is who he or she says he or she is. According to some aspects of an embodiment of the invention, the legal document 507 may include uploading or sending a license or certificate, verifying the user's licensing status and validity and may be cross-verified or cross referenced through a third party.

Figure 6:
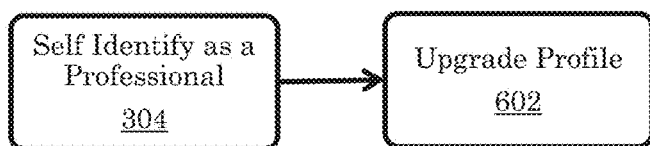
FIG. 6 is a flow diagram illustrating example operations of one or more aspects of an IDP system or method, according to an embodiment of the invention.

FIG. 6 is a flow diagram illustrating example operations of one or more aspects of an IDP system or method, according to an embodiment of the invention. According to some aspects of an embodiment of the invention, for example, as illustrated in FIG. 6, the user interface may permit the user to upgrade the user profile 602. However, the user interface may prevent the user from upgrading unless the user has self-identified as a professional 304. This can be done, for example, by displaying a button or link that appears to lead to upgrading, but not permitting that button or link to be clicked by the user unless the user self-identified as a professional. Additionally, a prompt may appear explaining to the user that upgrading requires self-identification as a professional.

Alternatively, the user interface may only permit the user to upgrade the user profile 602 after having self-identified as a professional 304. This can be done, for example, by displaying a button or link that, when clicked upon or selected, after one or more steps to be completed by the user, for example, entering information in one or more fields and/or selecting from a drop down menu, may cause the user's profile to be updated.

Figure 7:
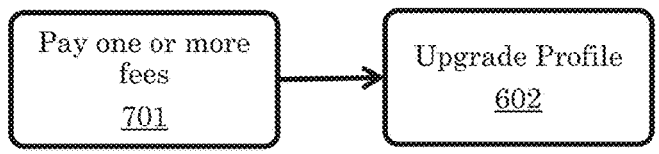
FIG. 7 is a flow diagram illustrating example operations of one or more aspects of an IDP system or method, according to an embodiment of the invention.

FIG. 7 is a flow diagram illustrating example operations of one or more aspects of an IDP system or method, according to an embodiment of the invention. According to some aspects of an embodiment of the invention, for example, as illustrated in FIG. 7, the user may be required to pay one or more fees 701 before upgrading the user profile or account 602.

Figure 8:
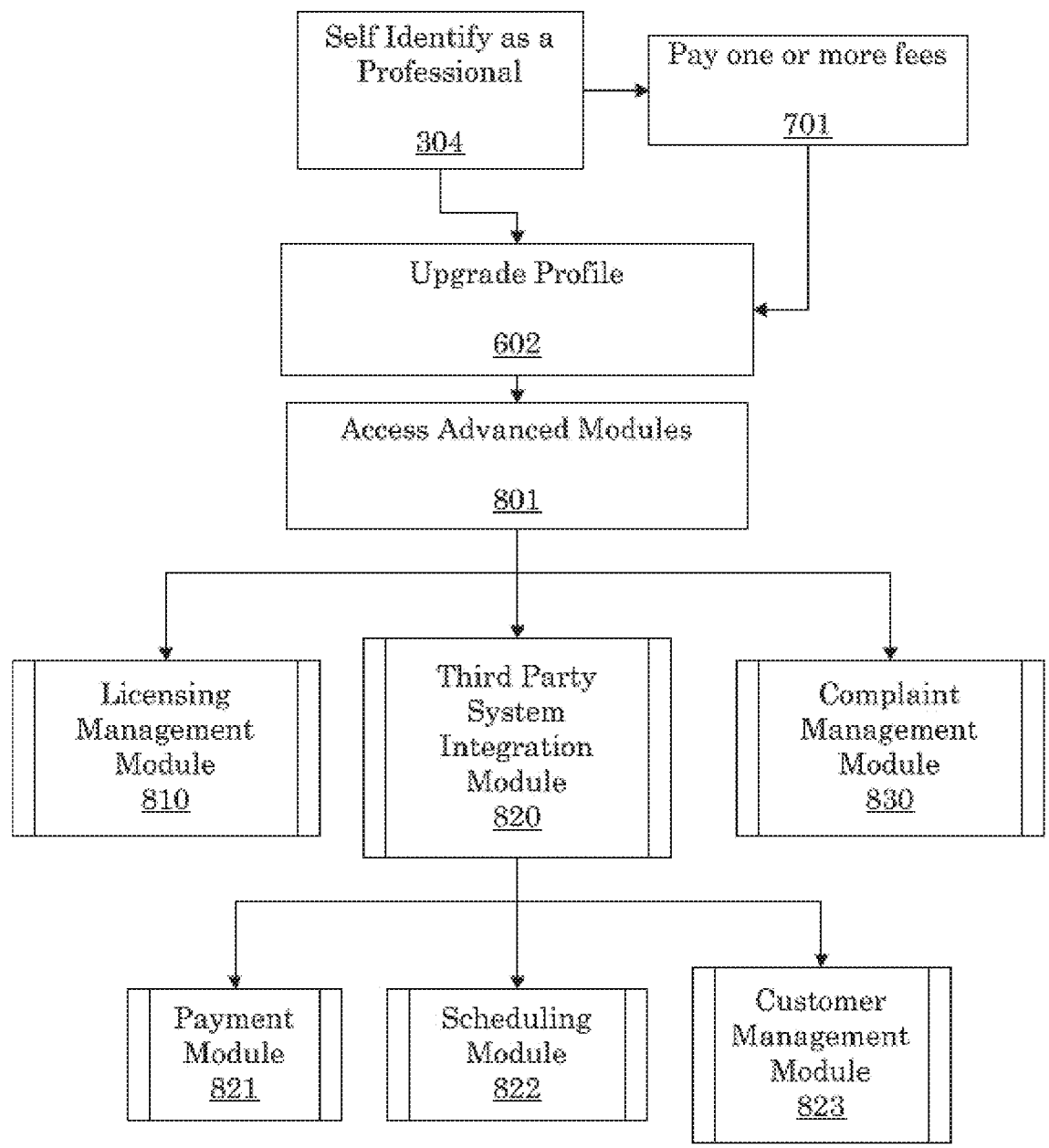
FIG. 8 is a flow diagram illustrating example operations of one or more aspects of an IDP system or method, according to an embodiment of the invention.

FIG. 8 is a flow diagram illustrating example operations of one or more aspects of an IDP system or method, according to an embodiment of the invention. According to some aspects of an embodiment of the invention, as shown, for example in FIG. 8, the user may be required to self-identify as a professional in step 304 and pay one or more fees in step 701 before upgrading the user profile in step 602. According to some aspects of an embodiment of the invention, the user may upgrade the profile in step 602 after self-identifying as a professional in step 304 and optionally paying one or more fees in step 701. In step 801, after upgrading the profile in step 602, the user may access advanced modules, including a licensing management module 810, a third-party system integration module 820, and a complaint management module 830. A third-party system integration module may include a payment module 821, a scheduling module 822 and a customer management module 823.

Figure 9:
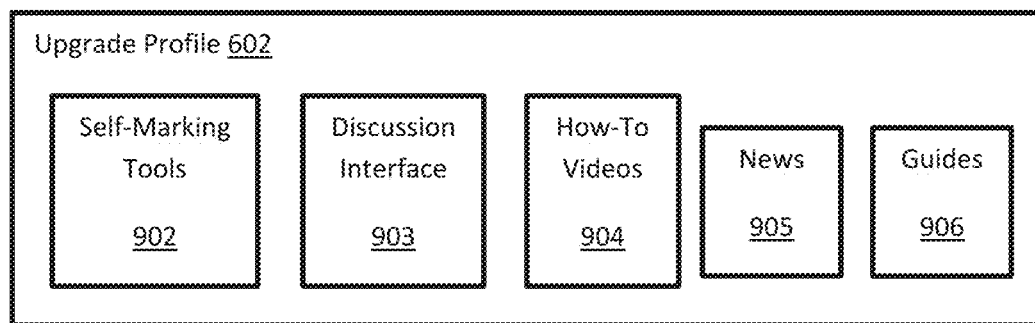
FIG. 9 is a diagram illustrating an example interface of one or more aspects of an IDP system or method, according to an embodiment of the invention.

FIG. 9 is a diagram illustrating an example interface of one or more aspects of an IDP system or method, according to an embodiment of the invention. According to some aspects of an embodiment of the invention, as shown, for example in FIG. 9, a user who has upgraded the user profile 602 may be able to access one or more self-marketing tools 902, a discussion interface 903 in which the user can discuss professional matters with industry professionals, how-to-videos 904 which provide an educational means to advance in the user's career, news 905 relevant to the profession, and/or guides 906 on advancing the user's career. These how-to videos can be uploaded by other users, or sourced elsewhere, for example, from beauty related websites or blogs owned by industry leaders.

Figure 10:
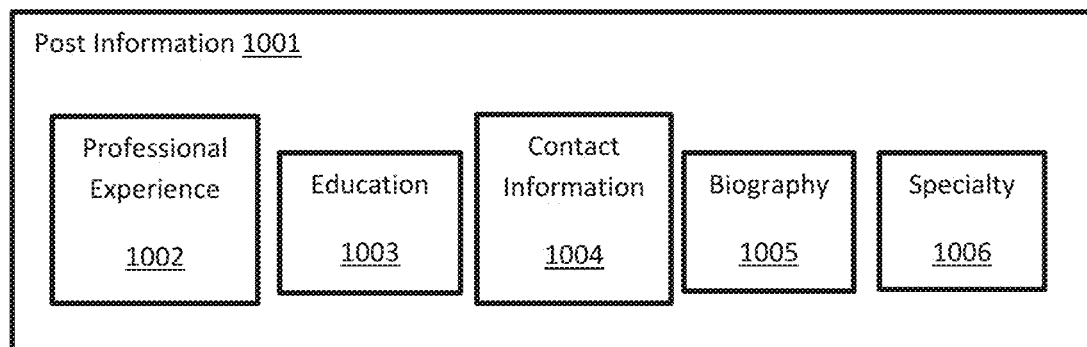
FIG. 10 is a diagram illustrating an example interface of one or more aspects of an IDP system or method, according to an embodiment of the invention.

FIG. 10 is a diagram illustrating an example interface of one or more aspects of an IDP system or method, according to an embodiment of the invention. According to some aspects of an embodiment of the invention, for example, as illustrated in FIG. 10, a user may be permitted to post one or more types of information 1001 on the user profile such as the user's professional experience 1002, education 1003, contact information 1004, biography 1005, specialty 1006, although the user may be required to upgrade the user's profile before posting such information. In addition, the user may be required to post photographs demonstrating the use or application of one of the user's specialties in order to claim that specialty. Education may include an undergraduate and/or graduate degree, professional or trade schools, such as salon or beauty schools, or specialized training programs.

Figure 11:
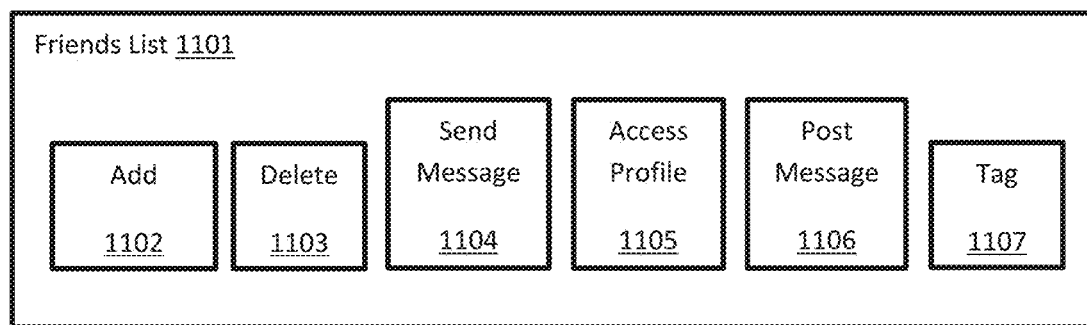
FIG. 11 is a diagram illustrating an example interface of one or more aspects of an IDP system or method, according to an embodiment of the invention.

FIG. 11 is a diagram illustrating an example interface of one or more aspects of an IDP system or method, according to an embodiment of the invention. According to some aspects of an embodiment of the invention, for example, as illustrated in FIG. 11, a user may be able to interact with a "friends" list 1101. This friends list is a collection of connections that the user has made by virtually "Mending" those one or more connections. Those connections can be other users or users who have self-identified as professionals. According to some aspects of an embodiment of the invention, the user cans friend profiles belonging to locations such as schools or work locations.

The user may be permitted to add 1102 or delete 1103 friends from the friends list, send messages 1104 to one or more friends, and/or access 1105 the profile belonging to a friend. Additionally, the user may be able to look at pictures posted by the friend, as well as other information which the friend posts on the user's profile. Also, the user may be permitted to post information 1106 or comments on the profile of the friend and/or tag 1107 the friend in pictures that the user posts on either the user's own wall or the wall of the friend.

Figure 12:
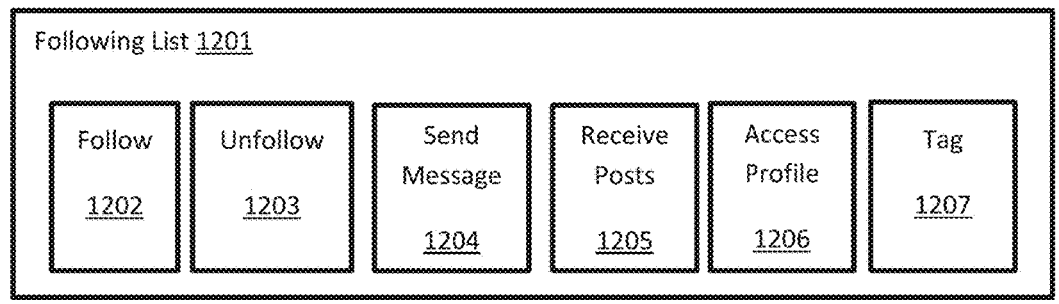
FIG. 12 is a diagram illustrating an example interface of one or more aspects of an IDP system or method, according to an embodiment of the invention.

FIG. 12 is a diagram illustrating an example interface of one or more aspects of an IDP system or method, according to an embodiment of the invention. According to some aspects of an embodiment of the invention, for example, as illustrated in FIG. 12, the user may be able to interact with a "following" list 1201. The "following" list is a collection of profiles of professionals that the user has assembled by virtually "following" those one or more professionals. In this aspect, the user can follow 1202 or "unfollow" 1203 professionals, thereby adding, or removing them, respectively, from the "following" list. The user may be able to send messages 1204 to one or more professionals that he or she follows and/or automatically receive posts 1205 made by the professionals that he or she follows, regardless of whether or not the professional intends to post on a particular user's wall. These posts may be publicly visible on the user's profile, or the user may be able to determine whether particular categories of posts appear on the user's wall, and if so, to whom those posts are visible. The user may also access the professional's profile 1206 or tag the professional in a picture or post 1207.

Figure 13:
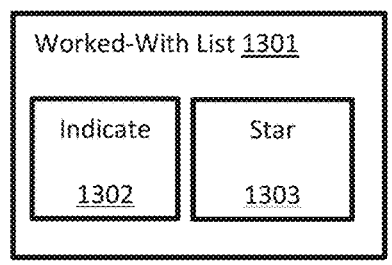
FIG. 13 is a diagram illustrating an example interface of one or more aspects of an IDP system or method, according to an embodiment of the invention.

FIG. 13 is a diagram illustrating an example interface of one or more aspects of an IDP system or method, according to an embodiment of the invention. According to some aspects of an embodiment of the invention, for example, as illustrated in FIG. 13, the user may be able to create or access a "worked-with" list 1301. The worked-with list is a collection of profiles, or otherwise identifying information, belonging to professionals whose services the user indicates 1302 he or she has used. The user may be able to add a star 1303 to the profile of a professional on the user's "worked-with" list. This star may indicate that the user has especially enjoyed or appreciated the services, or recommends the professional to others. It may be displayed on the professional's profile next to the user's photograph/profile picture.

According to some aspects of an embodiment of the invention, the user may add a numerical or letter rating in relation to a service provider or professional, type in data to a comment field in the profile of the professional, for example, as feedback for the professional. In some embodiments, an end-user of the IDP can also leave negative reviews and feedback. A negative review could be styled as a low number on a numerical scale, e.g. a 1 or 2 on a 5 point scale. Alternately, a negative review could be styled as a particular symbol or emoji, for example, a "thumbs-down" or a "sad-face."

Figure 14:
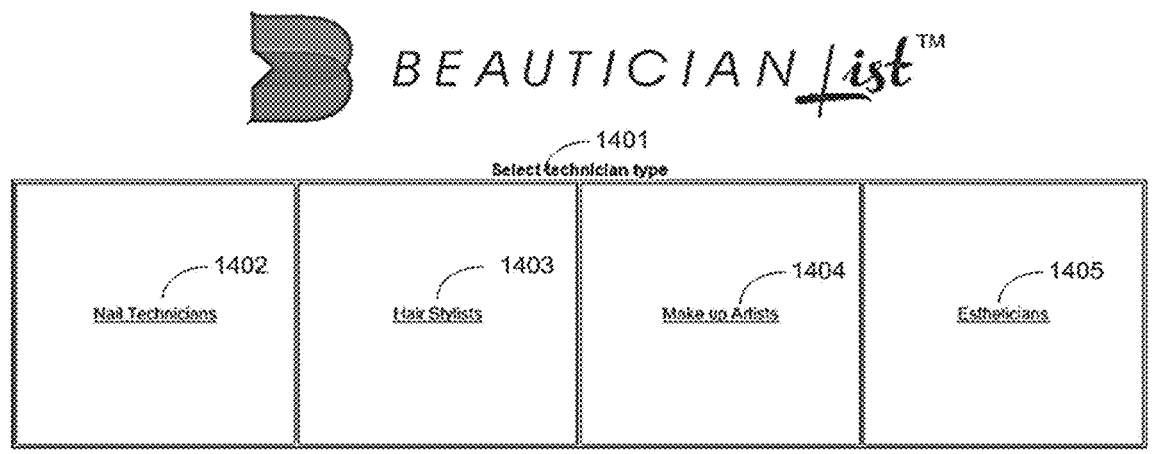
FIG. 14 is a diagram illustrating an example interface of one or more aspects of an IDP system or method, according to an embodiment of the invention.

FIG. 14 is a diagram illustrating an example interface of one or more aspects of an IDP system or method, according to an embodiment of the invention. According to some aspects of an embodiment of the invention, for example, as illustrated in FIG. 14, the user interface may display links 1401 to one or more services or types of professionals within an industry. For example, in the beautician industry, the types of professionals may include nail technicians 1402, hair stylists 1403, make-up artists 1404, and estheticians 1405. The user interface may also display instructions for accessing the one or more services or types of professionals.

FIG. 15 is a diagram illustrating an example interface of one or more aspects of an IDP system or method, according to an embodiment of the invention. According to some aspects of an embodiment of the invention, for example as illustrated in FIG. 15, a search module interface may include search fields 1501, including state, zip code, last name and/or specialty of the technician. The results 1502 of the search may include a technician name, license number, link to profile, number of likes received from users, and whether the disinfection procedures have been verified.

FIG. 16 is a diagram illustrating an example interface of one or more aspects of an IDP system or method, according to an embodiment of the invention, including searching functionality. According to some aspects of the IDP system or method, the user interface may display a search module 1601, including, for example, a link to a search page or displayed within a sub-frame or navigation pane, or the like. The search module may include one or more fields 1602, or queries, such as "state", "zip code", "last name", and "specialty" Each field 1602 may consist of a blank space which can receive, for example, some combination of letters, numbers, punctuation, search queries, hypertext, and/or search-directives inputted by a user, or a drop down menu that consists of pre-determined names or values. For example, the "state" field may consist of a drop down menu that consists of all fifty states and territories of the United States. For example, the "specialty" field may consist of a drop down menu that consists of terms such as tips, gels, gel polish, special occasion, nail design, natural nail, medical manicure/pedicure, spa manicure, 3D design, and paraffin/dry skin.

According to some aspects of an embodiment of the invention, for example, as illustrated in FIG. 16, once one or more fields 1602 are entered or selected, the search request may be processed by one or more algorithms, and the user interface may display a list of results. The results may be organized by categories, such as the name of the professional 1604, the professional's license number 1605, a link to the professional's profile 1611, the number of "stars" 1608 received by the professional from other users, professional services provided 1606, specializations, preferred professional services, and the like. Other categories may be industry or profession specific—for example, in the beautician industry, a category identifying whether the use of disinfection procedures by the professional have been verified by one or more users, or by a government agency, or certification body, and the like. Another category includes whether or not the professional is represented by an agency 1609. The search results for this category can be alphabetized by the name of the agency, or ordered by the average user review given to the agency. Another category includes whether the professional won any industry awards 1610. The search results for this category can be alphabetized by the name of the award, or ordered by the number of awards. Another category includes the geographic location 1612 in which the professional may be active. Yet another category may include the language 1613 spoken by the professional.

These results can be ordered based on forward or reverse alphabetization of the professionals' names 1604, numbering of their license numbers 1605 or the number of "stars" 1608 received, whether or not the professional has a profile, or the manipulation of any other category. These results can also be further refined by the user on the basis of the same search fields as discussed above, among other fields.

Alternatively, the user interface may display a partial or complete list or collection of professionals without requiring a search field to be entered or selected by the user. The user can scroll up and down or otherwise browse through the list or collection.

FIG. 17 is a diagram illustrating an example interface of one or more aspects of an IDP system or method, according to an embodiment of the invention. According to some aspects of an embodiment of the invention, for example, as illustrated in FIG. 17, the user interface may permit the user to interact with the list 1701 in one or more ways. For example, the user may be able to access 1702 the profile of a professional for more information, such as additional photographs, additional profile information, or a means of contacting the professional, whether by phone, email, or via the user interface itself.

The user interface may permit the user to create 1703 and/or edit 1704 the profile of a professional. For example, the user may be able to add one or more information types to the profile such as the professional's name, geographic location, specialty, years of experience, education level, language(s) spoken, and contact information such as a phone number, an email address, a home or business address, etc. In another example, the information a user may enter may be limited to a selection of pre-determined fields to fill out. For example, a user may be able to upload one or more photographs or pictures, either directly from a camera to the user interface, from a storage location on a computer or a portable drive, or source them from elsewhere on the internet. The photographs may be associated with a professional user profile and used with a self-marketing tool, to showcase the professional's work. In order to avoid duplication or inaccuracy, the professional may be able to approve the photograph before the association between the photograph and the professional is made public. The professional can upload or associate photographs to the user's profile without having to approve it.

Figure 18:
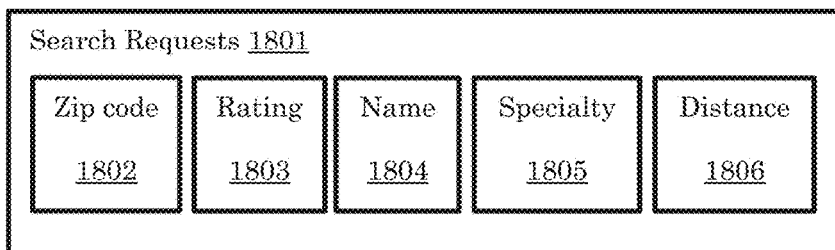
FIG. 18 is a diagram illustrating an example interface of one or more aspects of an IDP system or method, according to an embodiment of the invention.

FIG. 18 is a diagram illustrating an example interface of one or more aspects of an IDP system or method, according to an embodiment of the invention. According to some aspects of an embodiment of the invention, for example, as illustrated in FIG. 18, the received search requests 1801 may be limited to one or more categories, such as a selected zip code 1802, rating 1803, name 1804, specialty 1805, and/or distance 1806 from the zip code 1802 or from the current location of the user, or a particular geographic position.

Figure 19:
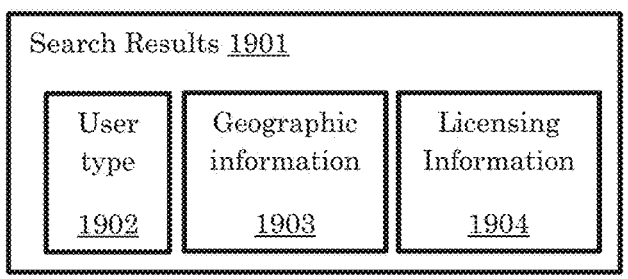
FIG. 19 is a diagram illustrating an example interface of one or more aspects of an IDP system or method, according to an embodiment of the invention.

FIG. 19 is a diagram illustrating an example interface of one or more aspects of an IDP system or method, according to an embodiment of the invention. According to some aspects of an embodiment of the invention, for example, as illustrated in FIG. 19, the received search requests 1901 may be filtered by predetermined attributes based on user type 1902 and including geographic information 1903 and licensing information 1904.

Figure 20:
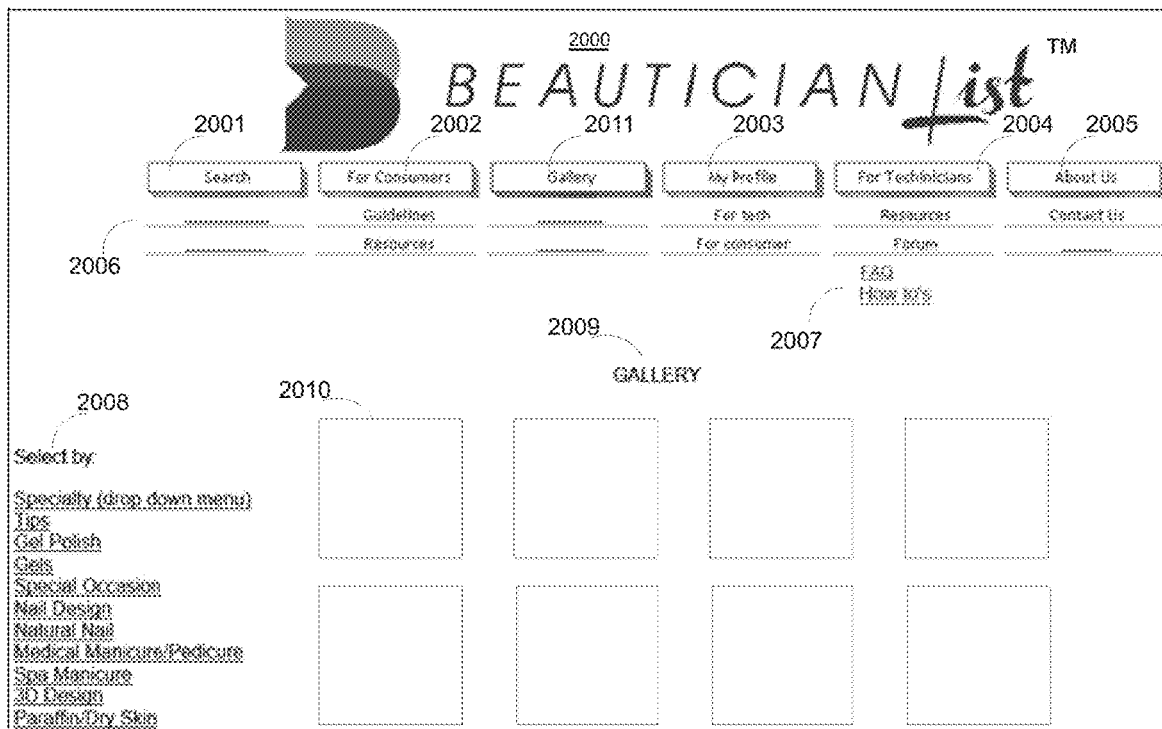
FIG. 20 is a diagram illustrating an example interface of one or more aspects of an IDP system or method, according to an embodiment of the invention.

FIG. 20 is a diagram illustrating an example interface of one or more aspects of an IDP system or method, according to an embodiment of the invention. According to some aspects of an embodiment of the invention, for example, as illustrated in FIG. 20, the user interface 2000 may display a page for consumers of an industry. Information in the user interface 2000 may be organized in a manner most helpful to a user, such as by the question and answer format found in FAQ sections or How to sections 2007. The user interface 2000 may include a navigation section including a search link 2001, a consumers link 2002, a gallery 2011, my profile 2003, technicians link 2004, about us link 2005 and sub-links 2006.

The user interface may include and display a gallery 2009. The gallery can be organized in one or more formats. For example, the user interface may display a collection of categories accessible via a drop down menu 2008, such as tips, gel polish, gels, special occasion, nail design, natural nail, medical manicure/pedicure, spa manicure, 3D design, and paraffin/dry skin, and each category, when clicked or selected by a user, will bring the user to a new page which displays pictures relevant to that category. Each category can be represented by the name of the category, a picture that represents the category, or both.

The gallery 2009 may also be organized as a series of photos 2010 or as one or more slide shows, such that one or more photos 2010 are displayed at a time, and the one or more photos 2010 are moving across the screen from left to right or in the reverse, enabling a user to view many photos without having to scroll through the photos manually. These one or more slide shows can be moved horizontally, vertically, or both. Optionally, the rate at which the photos are moving can be slowed down or even stopped through interaction with the user. For example, the closer the user moves a cursor to a designated area such as the center of the slide show, the more slowly the photos scroll, the further the user moves the cursor from a designated area, the faster the photos scroll, and when the user moves the cursor within a designated area, the scrolling stops. The gallery photos may include a showcase of a professional's previous work or user uploaded images related to the professional.

According to some aspects of an embodiment of the invention, for example, as illustrated in FIG. 20, the user interface 2000 may display one or more tabs 2001-2007 with links to one or more pages. For example, tabs may include a link to a search page 2001, a link "for consumers" 2002 that provides information relevant to a consumer of a particular industry, such as guidelines and resources, a link "for technicians" 2004 that provides information relevant to a professional within a particular industry, such as resources and forums, a link to a gallery page 2011 which displays pictures relevant to the profession, a link to a "my profile" page 2003, which directs a user to the user's own profile, and an "about us" 2005 page, which provides information about the creators or owners of the user interface and/or database.

Optionally, the tabs may display a list or menu of sub-tabs when clicked upon or otherwise selected by a user. Although not shown, these sub-tabs may each include a link to other pages. For example, "for technicians" 2004 may open up into a drop down menu of links when clicked upon or selected, those links including, for example, guidelines which provides information relating to industry standards, resources, which provides access to other websites or content contained elsewhere on the site, forum, which provides a space for professionals to engage conversationally or otherwise with other professionals, schools, which provides a list of schools and/or links that provide training or general education, locations, which provides a list of locations where professional services can be obtained, and jobs, which provides a board for employers to post job openings for professionals.

Figure 21:
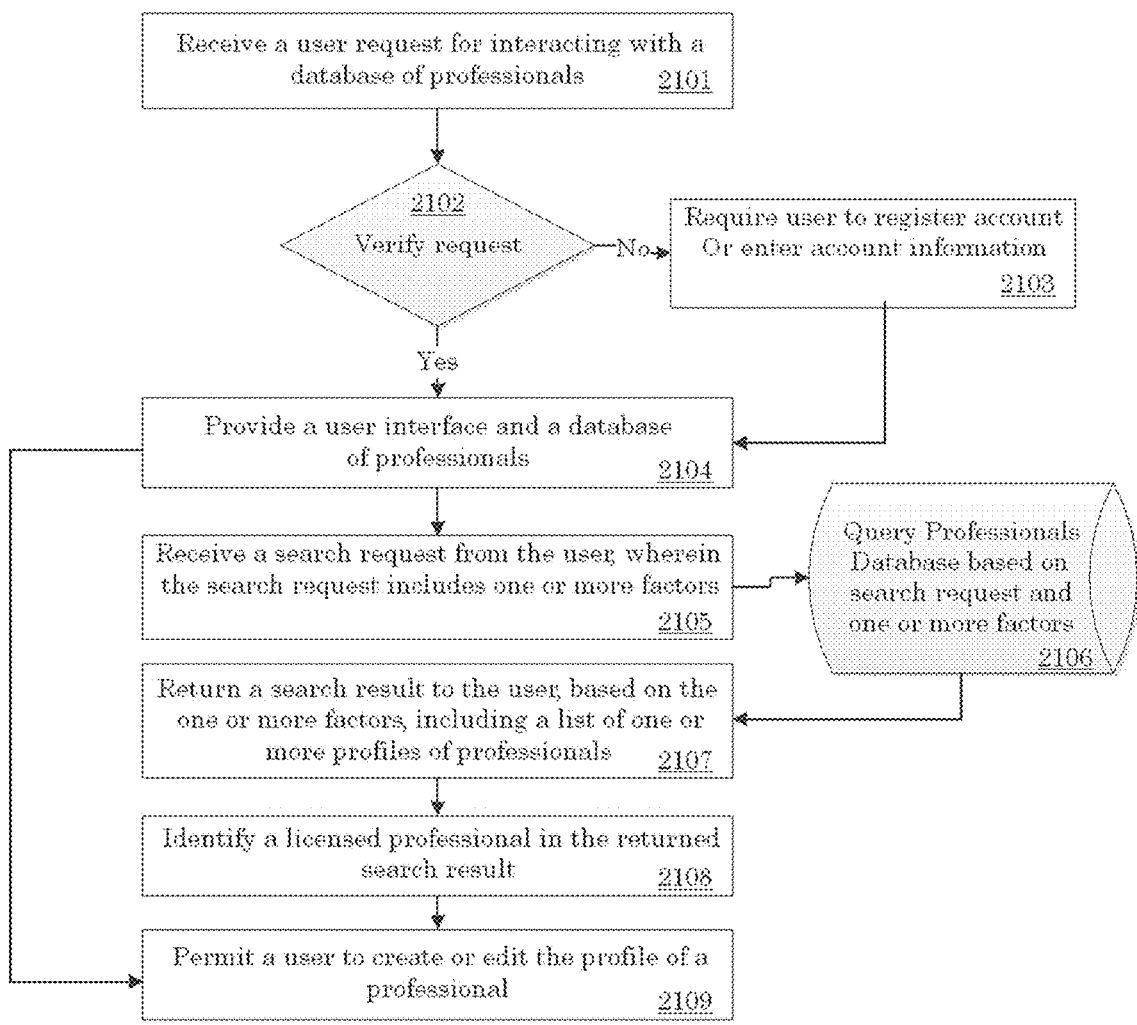
FIG. 21 is a flow diagram illustrating example operations of one or more aspects of an IDP system or method, according to an embodiment of the invention.

FIG. 21 is a flow diagram illustrating example operations of one or more aspects of an IDP system or method, according to an embodiment of the invention, including process 2100 and the services provided by an example professional's directory system according to an aspect of the IDP system or method. In step 2101, the system receives a user request for interacting with a database of professionals. This user request may include accessing a user profile, sending a message to another user, posting a message on another user's profile, or tagging another user to an image or post. The user request may also include starring another user's profile, friending, following, or adding the other user to a "worked-with" list. Additionally, this request may include accessing a gallery, one or more various resources such as industry guides, or how-to videos. Furthermore, this request may be include searching the database for one or more terms.

In step 2102, the system verifies the received request, and may require the user to register a user account or enter account information in step 2103. Verification information may include not only a username and password, but also information that supports the user's identification as an industry professional, such as the user's name, the school from which the user graduated a certification number, a license number, and/or a legal document. Alternatively, if the request already contains verification information or if verification is not required, or after a user completes step 2103, in step 2104, the system provides a user interface and a database of professionals to the user. Then, the system can permit a user to create or edit the profile of a professional, depending on user privileges within the system in step 2109. Content that can be entered into a professional profile may include a professional's experience, education, contact information, biography, specialty, as well as other relevant information. Alternatively, the system may receive a search request from the user in step 2105. The search request may include one or more factors as described herein, for example a professional's name, license number, the services provided by the professional, the professional's area of specialty, zip code, number of stars, awards, the languages spoken by the professional, the locations where the professional provides services, and a link to the professional's site. In step 2106 the system queries the professional's database based on the search request and one or more factors and returns the search result in step 2107. Factors may include a zip code, either in which the professional works or where the user lives, or any other relevant term discussed above. The search result may include a list of one or more profiles of professionals and the factors included in the search request. In some embodiments, additional factors may be displayed in the search result for upgraded users. In step 2108 the system identifies a licensed professional in the returned search result. This may be accomplished by visually distinguishing the professional in the result. In step 2109 the system permits a user to create or edit the profile of a professional.

The user interface in step 2104 may display the user's own profile. The profile may be displayed in a form viewable to other users, or in a form that can be edited by the user. Information that can be displayed or edited includes the user's name, contact information such as the phone number and email address, a link that leads the user to upgrading the user's profile, a link that enables a user to see what the user's profile would look like if it were upgradeable, the user's license or certification number, employment status, work address, a profile photo, experience, education, and specialty. The information may be editable in an empty field, through a drop down menu, radio dials, or any other relevant user interface means.

The user interface may also give the user the option to input credit card information. This credit card information can be used to upgrade a user's profile, buy a subscription to use certain services available, purchase goods offered on the site, or for any other purpose.

The user interface in 2104 may display resources available for technicians. For example, these resources may include a list or a link to a page or list of associations that are relevant to a particular industry and which a technician may join, publications which a technician may inspect, tradeshows which a technician may attend, guides which a technician can read, and competitions in which a technician can compete. These resources may come from industry guides, professional schools, articles or blogs from industry leaders, or other reputable sources.

According to aspects of an IDP system or method according to an embodiment of the invention, the system or method includes a database directory of professionals. The system or method receives, aggregates, compiles, formats, and processes records of licensed professionals into an interactive directory accessible by users and professionals. The system or method receives records of professionals, in varying document file and information formats, from state licensing bodies. The document file formats may include, for example, text, word processing, spreadsheet, database files, and the like. The information formats may include, for example, lists, tables, databases, and the like. The system or method includes a directory processing module for crawling, parsing, formatting and processing the lists of professionals into a uniform format and structure.

According to aspects of an IDP system or method according to an embodiment of the invention, the system or method includes a database directory of professionals, for example, cosmetology licensees, accessible to the public via an easy to navigate informative website, that will engage and also educate the user on the current guidelines of the industry and provide self-marketing tools for cosmetology professionals. Cosmetology may include aspects relating to the study and application of beauty treatment. Branches of specialty may include hairstyling, skin care, cosmetics, manicures/pedicures, and electrology. The directory may serve to recognize and promote nail technicians and cosmetologists that are licensed and that are practicing the proper disinfection procedures and showcase and promote their talents and credentials.

According to aspects of an IDP system or method according to an embodiment of the invention, the system or method permits a user to interact with a database of professionals, the method comprising, providing a user interface and a database of professionals, receiving a search request from the user, wherein the search request includes one or more factors, returning a search result to the user, based on the one or more factors, wherein the search result includes a list of one or more profiles of professionals, identifying a licensed professional in the returned search result, such that the licensed professional is identified in a visually different manner than other professionals included in the returned search result, and permitting a user to create or edit the profile of a professional. In some aspects, a user may be required to sign in before accessing the database. The IDP system or method may provide upgrading functionality for upgrading a user profile upon receiving an upgrade request from a professional user. According to some aspects of the invention, the IDP system or method may provide functionality for self-marketing tools to users who have updated their profiles. According to some aspects of the invention, the IDP system or method may provide functionality for posting experience, education, contact information, biography, and specialties information by the user, by querying the database and user input. According to some aspects of the invention, the IDP system or method may provide functionality for a discussions interface configured for user discussion with industrial professionals, how to videos, news and guides on advancing their careers. According to some aspects of the invention, the IDP system or method may provide functionality for creating a "friends" list for each user, and, adding users to the "friends" list when prompted to do so by a user. According to some aspects of the invention, the IDP system or method may provide functionality, including for example, creating a "following" list for each user; and adding professionals to the "following" list when prompted to do so by a user, creating a "worked with" list for each user; and, adding professionals to the "worked with" list when prompted to do so by a user, or adding a "star" to the profile of a professional when prompted to do so by a user. According to some aspects of the invention, the database is accessible through a website. According to some aspects of the invention, the IDP system or method may provide functionality for an informative user interface configured to inform a user about standards, techniques, and procedures accepted in an industry. According to some aspects of the invention, the received search requests or search results may be limited to a selected zip code, name, or specialty. According to some aspects of the invention, the received search requests or search results are filtered by predetermined attributes based on user type and including geographic information and licensing information. According some aspects of the invention, the search request may include a plurality of factors and each item in the search result may relate to at least one of the plurality of factors.

According to some aspects of an embodiment of the invention, an IDP system or method, including, for example, an IDP engine, may provide access to an integrated platform of services for the professional, for example after upgrading a profile, including access to advanced modules, such as a licensing management module, a third-party system integration module, and a complaint management module. A third-party system integration module may include a payment module, a scheduling module and a customer management module.

In some embodiments of the IDP, a professional who purchases an upgraded account may be provided with an interface of tools or advanced modules useful to the professional's industry and business. This integration will allow information from the IDP engine, including information on the professional's profile, the profiles of the businesses the professional has been associated with, and the end-users who have left comments and/or ratings for the professional and their salons, to flow into the third-party system. Likewise, information regarding the professional or end-user's use of the third-party system can flow back into the IDP engine. Thus the professional using the IDP engine could view a display, generated by the IDP engine, which cross references any data returned by the third-party system with any data stored by the IDP engine. This information flow between the IDP engine and the third-party system causes the usefulness of the third-party system to be enhanced by the use of the IDP engine in a synergistic way, beyond the usefulness of the third-party system, or the IDP engine, operating independently. Third party systems that an IDP engine could integrate with include, but are not limited to, scheduling services, practice management services, billing services, marketing services, coupon generation services, email advertising services, and other services that could make use of data from the IDP engine, and which the IDP engine could display and/or make use of the data generated by those systems.

For example, a beautician professional working at a salon may build up a positive reputation, and positive reviews, on an IDP engine. Should the professional desire to leave the salon and start their own business, the IDP engine could beneficially provide a direct connection to third-party services. This direct connection will have synergistically enhanced effects over the professional utilizing these services on her own. For example, while the professional has been employed at the salon, many customers may have left reviews of the professional. Without the IDP engine, when the professional starts their own business, they could sign up for an email marketing service, but they may have no way to reach those customers who have left reviews. However, if the professional signs up with an email marketing service which is integrated with the IDP engine, the professional may be given the option to market their new business directly to those customers who have left reviews for them while they were employed at the salon. Likewise, information collected by the email marketing campaign can flow from the email marketing service into the IDP engine, and be cross referenced with information relating to end-users in the IDP engine. Alternately, the professional could use the integration to market to any customers of the salon. In some embodiments, if a professional or business has an upgraded account, they could hide their customer list from current or former employees, so that the information does not flow into third-party integrated systems.

By way of another non-limiting example, a professional may wish to incentive customers to visit with online or offline coupons. The professional could use a third-party service to generate the coupons. However, if the coupons are generated by a third-party system integrated with the IDP engine, a code could be embedded into the coupon that identifies the coupon user to the coupon system. The identification of coupon using users can flow from the coupon system into the IDP engine. For example, coupon using users could be cross referenced with users who leave comments, to generate a list of users who leave comments and use coupons. This information is more valuable than merely information about users who use coupons, non-correlated with information about users who leave comments.

In some embodiments of the IDP, a professional who purchases an upgraded account may be provided with an interface of tools or advanced modules, useful for management and maintenance of professional certifications. For example, the IDP may provide an interface to update, change or correct information on the user's licensing certificates or records of licensing agencies. Additionally, the IDP may provide an interface for the user to undertake any business that would normally be conducted with the licensing or regulatory agency. Such business may include upgrading, renewing, register for examinations, registering for inspections, contesting inspections or determinations, taking continuing education requirements, reporting continuing education requirements, and/or any other business in which the which the agency would interact with the professional, whether online, via mail, or via telephone. A system implementing the IDP would have the capability to receive user input, instructions, and requests relevant to one or more of these types of agency business, and transact the business with the agency according to its requirements and/or protocols. Thus for example, the IDP would be able to receive a request to renew a certification via an online form, record all the information required by an agency's existing paper based form, print out the paper based form, mail the form to the regulatory agency, and receive and report on any reply correspondence from the regulatory agency. Alternately, if the agency required electronic submission of complicated forms, the IDP could simplify the form through use of existing information from the end-user's profile, and submit the electronic form for the user. In this way, the IDP provides a technological bridge between modern and efficient online systems which end-users are used to, and potentially outdated agency and/or government systems which those end-users are required to interact with.

According to aspects of an IDP system or method according to an embodiment of the invention, the system or method includes a self-promotion module for cosmetologists to market themselves through bios and pictures showing off their skills. The system or method provides modules and functionality for professionals to be able to market themselves instead of, or in addition to, relying on the salons that they currently work in. The system or method may provide promotion functionality for a cosmetologist, and a salon. In some embodiments, functionality for the cosmetologist is the main focus, instead of, or in addition to, the salon.

In some embodiments, salons will be able to advertise or utilize self-marketing tools, only if someone in their salon has signed up for the updated or upgraded profile feature and/or paid one or more fees. In some embodiments, a separate link to the salon may be displayed in the professionals' profile. In some embodiments, the salons may create a profile, for example, after paying an additional fee. In some embodiments, the salon profiles and the professionals' profiles may be linked in the interactive directory. In some embodiments, the salon's profile may include links to the professionals' profiles associated with the salon and the professionals' profiles may include links to the salons associated with the professional. In some embodiments, salons will be able to post job advertisements in a designated section of the IDP system, such as a message board, forum, or classifieds section, and/or on their own profile, including visually marking a salon profile to indicate an open job opportunity.

In some embodiments, the IDP system or method provides a blogging module allowing users to blog about products and services, including reviews about the products and services, and uploading files or images, according to aspects of the IDP system described herein. The blogs, reviews, files and images are associated to the user, the product, the service professional in the IDP system. Users of the IDP system may star blog entries, according to aspects of the IDP system described herein. In some embodiments, for example, the starred bloggers may show up as links in the starring user profile, according to aspects of the IDP system described herein.

According to aspects of an IDP system or method according to an embodiment of the invention, the system or method provides the general public vital information on how the proper techniques should be performed and the correct disinfection procedures. The system or method may verify or confirm that a cosmetologist received credible education and a license in their respective State. The system or method provides a search module to search for a licensed cosmetologist via zip code, by name or by specialty, or the like. Specialties may be chosen based on popular categories of the particular cosmetology field. Nail technician specialties may include, for example, specialties in tips, gel polish, special occasion, nail design, spa manicure, medical manicure and/or pedicure, and the like. In some embodiments, the system or method may protect private professionals' information by restricting the search query and the search results by a zip code and/or category of the professional. In some embodiments, pasting information from the directory may be prohibited. In some embodiments, such restrictions may be controlled or edited by the professional or an administrator, or the like.

According to aspects of an IDP system or method according to an embodiment of the invention, the system or method may require users to sign in and create a profile with their contact information. In some embodiments, users may not be required to create a profile in order to browse, but will be required to create a profile in order to "star," flag, or save service professional or a technician, save searches, and upload pictures. When a user signs up, registers, or signs in, the user may have to indicate if the user is a licensed technician or a regular, or general public user. In some embodiments, the system or method will provide an option to the licensed technicians to upgrade their profile. In some embodiments, the system or method verifies user information for validity and authenticates the user. In some embodiments, the system or method provides an endorsement module, allowing users, including registered users, professionals, or the like, to endorse, rate, or vote for, professionals, including nail technicians.

According to some aspects of an IDP system or method according to an embodiment of the invention, the system or method includes taking into a count an end user type, location and relevant regulations. For example, some states do not require licensing for cosmetologists. In this case, for example, the IDP system or method may allow an end user to register as a service professional if the user type and location matches a permitted combination, based on predetermined rules and regulations.

According to some aspects of an IDP system or method according to an embodiment of the invention, the system or method includes editing and managing user profiles, including regular users and professional users, for example, via a profile module. In some embodiments, profile layout, cost and functionality will vary depending on the type of user. For example, general public users may create free profiles. In some embodiments, the profile module allows users to become friends with other users as well as professionals, for example, nail technicians. The profile module provides functionality to upload photos, and to tag the related professional, for example, a nail technician that they worked with. The system or method, including the profile module and a search module, may provide search functionality to search through other members pictures for inspiration, and to save and tag the pictures. In some embodiments, while browsing through pictures and service professional profiles, the user will be able to star, save or bookmark the pictures and profiles they like, for example to come back to see them later. In some embodiments, the starred pictures and profiles may appear on the starring user profile as links, for easy access to the starred items in the future.

In some embodiments, while browsing through pictures the user will be able to vouch for, vote for, or rate, the licensees by giving a star to the ones they personally worked with. In some embodiments, the star feature may be implemented as a review and rating system and the number of stars may appear on the licensee's profile, as an additional way for the professional, for example a cosmetologist, to stand out among their peers. In some embodiments, the IDP system or method may track the stars and prevent the same users from starring the same profiles or images more than once. In some embodiments, stars may be attributed to uploaded pictures, related to the service professional, and the number of stars for a particular picture may likewise appear on the service professional's profile. In some embodiments, the number of stars associated with a service professional may appear in search results, for upgraded users or all users. In some embodiments, the user may review the professional and the reviews may serve as an endorsement. For example, the IDP system or method may aggregate the number of stars for a service professional profile and display in the search result the number of stars associated with the service professional, among other items such as name, license number, location or city. In some embodiments, the verified license of a professional may be showcased on the professional's website and serve as an endorsement.

In some embodiments, a user, such as a regular user or a professional user, may upload pictures to a service professional's profile or tag the nail service professional in their own uploaded pictures, for example a consumer uploading pictures of nail art done by a nail technician, to a nail technicians profile. The service professional may be provided functionality to first approve, deny or modify the upload, tag, or association to the professional's profile. In some embodiments, a user, such as a regular user or a professional user, may be able to indicate or specify a particular category for the upload, for example an upload of an image, where the particular category is correlated, for example, to the service professional's specialty category, or another category related to the content of the image. The upload or image category may be used to filter or group a gallery of such files or images, or search results containing such files or images, or the like.

In some embodiments, the files or images may be tagged with, or specified for, the products used in the file or image. Such product tags may be cross referenced with external modules for commercial products. For example, the user may upload a picture of nails, indicate the service professional that painted the nails, and indicate the brand name of the polish, and color name of the polish, for example "Pretty in Pink," and any other product used, related to the image. Such information associated with the image may be used to filter or group a gallery of such files or images, or search results containing such files or images, or the like. In some embodiments, files or images may be filtered or grouped by consumer images or professional images. In some embodiments, such images and files, and related information, may be associated with the service professionals profile, after a service professional approves the image, and also displayed as an uploaded consumer file or image. If the service professional does not approve the file or image, then the file or image will not be associated with the professional's profile but may still be listed as a consumer upload, without the association. In some embodiments, the IDP system or method determines duplicate images or files that were uploaded, and notifies the uploading user or the service professional associated with the file or image to select one of the duplicates for use in the system.

In some embodiments, additional user profile functionality may be provided for some users, including professionals, for example, users or professionals that update or upgrade their profile. In some embodiments, additional functionality may be provided for paying members. Users with an updated or upgraded profile, or paying members, can stand out with a unique user profile, including additional information, for example, listing their education experience, contact information, and a bio of themselves outlining what their passions and special skills are. In some embodiments, when signing up for the updated or upgraded profile, users may have to provide their license number to verify the user. In some embodiments, users may indicate all the specialty fields that they excel in. In some embodiments, users may provide pictures to go along with the category or specialty in order to be listed within that category. In some embodiments, the updated or upgraded profile, and search results, will show how many stars, if any, a user has and non-updated or non-upgraded user profiles will only display in the profile, and in search results, their name and their license number.

In some embodiments, additional user profile functionality may be provided for some users, including non-professionals, for example, users or non-professional enthusiasts that update or upgrade their profile. Users that are not licensed but particular service enthusiasts, for example, users that love to do their own nails, makeup and hair styling, will be able to create a different type of profile consisting of pictures that others can use for inspiration. These pictures can be searched for and found in the gallery, as described herein.

In some embodiments, professional user profiles may include a question and answer section where other users of the IDP may post questions for the professionals to answer them. In some embodiments, the question and answer functionality may be provided in a separate section of the IDP or in a separate module.

According to some aspects of an IDP system or method according to an embodiment of the invention, the system or method includes a education management module configured for marketing education programs by professional or trade schools directly to the end user of the IDP, such as a consumer, a professional user, or a salon.

According to some aspects of an IDP system or method according to an embodiment of the invention, the system or method includes providing and managing exclusive access to resources including advanced modules, discussions with industry professionals, how to videos, news and guides on advancing their respective professional careers.

According to some aspects of an IDP system or method according to an embodiment of the invention, the system or method includes providing state licensing related information, including, for example, for each state, licensing and inspection practices, such as frequency and/or patterns of inspection, statistics related to salons, inspectors, and/or professionals, salon per inspector ratios, professional per inspector ratios, or the like.

In some embodiments, the system or method may include an unofficial inspector module, for example, directing consumers to licensed individuals, providing complaint making functionality, and the like, according aspects of an IDP system or method according to an embodiment of the invention. In some embodiments, the system or method may include a certification module, for example, testing salons and technicians for their knowledge of industry standards and disinfection procedures, and providing resulting information to users or salons, along with related helpful information.

According to some aspects of an IDP system or method according to an embodiment of the invention, the system or method provides, for an end user of the IDP, including a general user, such as a consumer or client, or the like, and a service professional user, such as a service provider, trade professional, licensed or certified professional or service provider, or the like, an IDP method comprising storing a plurality of professional information records, wherein each professional information record relates to a service professional, receiving, from a third-party, a plurality of third-party information records, wherein each third-party information record relates to a service professional and includes licensing information for the service professional, cross-referencing a professional information record with a third-party information record, based on one or more elements related to the service professional, displaying a search result to an end user, in response to a search request, wherein the search result includes a list of one or more user profiles of service professionals and cross-referenced information, identifying a service professional in the returned search result, such that the service professional is identified in a visually different manner than other service professionals included in the displayed search result, and permitting the end user to create or edit the user profile of a service professional. According to some aspects of the invention, the search request includes predetermined attributes depending on user type of the end user, and includes geographic information and licensing information.

In some embodiments, professional information records may relate to a service professional, a place of business, such as salon spa, a licensing agency, or a trade school. In some embodiments, third-party information records may include, for example, service professional's name, licensing number, date of birth, degree or school, address, or other identifying information. In some embodiments, cross-referencing a professional information record with a third-party information record, may be based on one or more elements related to the service professional, including for example, identifying information such as name and address of a service professional. The one or more elements may also include license number, licensing agency, licensing state, and the like.

In some embodiments, third-party information records may be received from an outside agency, for example, an information record keeping entity, such as a social networking system, a government agency, a licensing agency, a financial institution, a schooling institution, or the like. Third-party information records may include identifying information, which may be used to cross-reference with elements of professional records. Cross-referencing may be achieved by applying a matching algorithm to determine a match between the records based on elements in the third-party records and the professional records. The matching algorithm may also identify and flag inconsistent elements between the third-party information records and the professional records. Such flags may be provided to the end-user and/or the third-party for verification or correction. The IDP may permit the end user or the third party to edit the one or more profiles of service professionals. The elements may include, for example, name, state, license number, or the like. The elements may be analyzed for similarity by the matching algorithm. The elements to use for matching may be identified by parsing the third-party data for structure and format to identify elements that may be used for cross-referencing.

According to some aspects of the invention, the system or method includes upgrading the user profile in response to an upgrade request from a service professional and upon receiving one or more fees facilitated by an integrated payment module. In some aspects, self-marketing tools are provided to service professionals with upgraded profiles. According to some aspects of the invention, the system or method includes cross-referencing the professional information record, based on end user input including, for example, name, licensing information, experience, education, contact information, biography, and specialty information.

According to some aspects of the invention, the system or method includes functionality and user interfaces configured for discussion and content sharing related functionality, including how-to videos, news, guides and career advancing services, related to service professionals. According to some aspects of the invention, information related to standards, techniques, and procedures accepted in an industry, related to a service professional, including third-party information, is provided to an end user, including a regular user and a service professional.

According to some aspects of an embodiment of the invention, the user may make complaints and leave negative reviews. The complaints functionality may be provided by a complaints module, based on the professional licensing information, and forwarded to a professional licensing body or place of employment. In some embodiments, the complaints module may include a resolution sub-module allowing the service professional to intercept the complaint to address and respond to the complaint. The complaints module may draft or fill out an official complaint form to mail in to a government licensing body, with a copy to the professional's place of business. The complaints module may track the status of the complaint for the user and the professional. The complaints module may provide a mediating service to allow a professional to intercept the complaint by addressing the complaint and mitigating the problem with the user.

In some embodiments, an end-user of the IDP can use the system to report a professional to an agency. Consumers can file various types of reports with agencies, including general complaints, complaints of specific malfeasance, complaints regarding expired licenses, complaints regarding unsafe practices, complaints regarding unclean workplaces, and/or any other type of complaint or report relating to a situation regulated by the agency. These complaints may be filed with various agencies, including local, state, federal, or independent agencies, and including different types of agencies such as regulatory agencies, licensing bodies or boards, law enforcement agencies, environmental protection agencies, and even consumer watchdog groups. For example, if a consumer visited a services provider and observed that the service provider's workplace did not meet the professional standards for cleanliness, the end-user could use the IDP to file a complaint with the state agency regulating the cleanliness of workplaces for that category of service provider. To enable the consumer to file this complaint, the IDP may include a list of agencies relevant to a particular professional's license or business, and optionally, a list of the types of complaints or reports that those agencies will consider. The IDP may display the list of agencies and/or complaints or reports to the user and allow the user to select one. Alternately, the IDP could receive input from the user on what sort of report they would like to make, compare the input to the list of known agencies and complaints, and select the appropriate agency or agencies, and complaint or complaints, from the lists. The IDP would then collect all information from the user necessary to make a proper complaint, according to the required forms and/or formalities of the agencies, and prepare and file the complaint for the end user. It is important to note that the IDP will properly format and submit the complaint according to whatever protocols are required by the agency. For example, some agencies require a report to be submitted in duplicate, or on a particular type of pre-printed form. Alternately, some agencies require a report to be submitted first to one office, then a receipt to be submitted to another office. A system implementing the IDP will have the capability to follow the appropriate protocols required by the agencies' report process, as described in the instructions and/or legal requirements for said agency, including but not limited to: creating physical documents to be mailed, mailing documents, receiving receipts, filing electronic forms, creating electronic signatures, presenting power-of-attorney forms to the end user, and so on.

In some embodiments, particularly in those embodiments where an end user may use the IDP to submit complaints to an agency, the IDP may incentivize professionals to register, and optionally to pay for upgraded accounts, by preventing users from filing complaints regarding professionals with upgraded accounts, optionally until the professional has had an opportunity to respond to the complaint. In some embodiments, consumers may file complaints immediately against professionals without upgraded accounts, but if a professional has an upgraded account, a delay is introduced into the filing, and the professional is notified. During the delay, the professional could contact the end-user and negotiate with them to remedy the subject of the complaint. In other embodiments, when the complaint is entered, a delay is introduced, and the IDP notifies the professional that a complaint will be filed against them, via email or postal mail, and provide them with the opportunity to purchase an upgraded account to negotiate with the consumer regarding the complaint. If the professional declines to purchase the upgraded account, the complaint will be filed. If the professional does purchase the upgraded account, they have the opportunity to correspond with the end-user to resolve the complaint without the agency being notified According to some aspects of the invention, the system or method includes generating a report on the service professional, in response to a reporting request from the end user, based on a mandated format of a particular third-party agency, wherein the report includes information from the professional information record, the third-party information record, and report information entered by the end user. For example, a mandated format for one particular third party agency may include an electronic form submitted at a particular website or a hard copy mailed to a particular location. For example, a mandated format for one particular third party agency may include first submitting an electronic form and then a hard copy form, including identifying information related to a complaining user and a service professional, and details relating to the complaint, and mailing it to a particular location, along with particular related documentation.

According to some aspects of the invention, the system or method includes transmitting, in response to a reporting request from the end user, a report to a particular third-party agency responsible for the licensing of the service professional to perform one or more services provided by the service professional, depending on a format mandated by the particular third-party agency, including at least one of electronic submission and a printed and delivered form.

According to some aspects of the invention, the system or method includes receiving an agency transaction request from the end-user, wherein the agency transaction request comprises transaction information identifying an agency transaction to be performed, information identifying a professional information record, and form data relevant to the agency transaction to be performed and performing an agency transaction based on the agency transaction request, comprising communicating with an agency regarding the agency transaction to be performed identified by the agency transaction request.

According to some aspects of the invention, the system or method includes transmitting, third-party-request information related to the professional information record, to a third-party system via a network, and receiving, third-party-response information related to the professional information record, from a third-party system via a network, wherein the third-party-request-information and the third-party-response-information include information identifying a plurality of end-users of the IDP system.

According to some aspects of an IDP system or method according to an embodiment of the invention, the system or method provides functionality for making online complaints by filing a complaint with a particular third party agency, for example, a government body, and/or reporting unlicensed practitioners to the agency and/or a salon. In some aspects, the system or method may provide functionality for mailing out the complaint with the identifying information of the user, and the professional.

According to some aspects of an IDP system or method according to an embodiment of the invention, the system or method integrates third party systems or modules, such as a scheduling application or module, a payment application or module, and a customer management application or module. In some aspects, the system or method provides a single integrated platform including third party systems or modules integrated with the IDP, keyed or cross-referenced to a license number and/or name of a service professional. For example, a customer management application or module may be integrated with the IDP and generate and mail or email, or otherwise send, post cards, promotions or coupons, once a month or in other predetermined time intervals, to the top customers of the service professional, and/or to top end users of the IDP, based on metrics aggregated by tracking the end users while using IDP. In some aspects of the invention, the system or method provides an integrated platform for delivering third-party services to the service professional. In some aspects of the invention, the system or method provides reports and related metrics to the service professional, with ability to print out reports about related end-user activity, including for example end user likes and search related information.

According to some aspects of an IDP system or method according to an embodiment of the invention, the system or method includes a certification management module configured for managing professional licenses and certifications, by keeping track of requirements, components, rules and regulations to maintain the licenses, based on online and offline components, uploading and storing licenses, certificates, and the like, taking into account and applying relevant state licensing body or agency requirements or rules, tracking completion and status of the requirements, interfacing with the relevant state licensing bodies or agencies, electronically, personally or via mail, and providing a comprehensive module including an overview, summary and status of these components and requirements.

Appearance enhancement and beauty services are in high demand. Service providing professionals in this industry have varying educational and training qualifications and regional licensing requirements. However, consumers cannot easily compare service providing professionals and determine whether the professionals are trained and licensed to provide such services. Additionally, while many states have databases that list the professionals in a particular industry, there are many industries in which there is no statewide or national database of professionals. As a result of this lack of transparency in the industry, many professionals do not get proper licensing, training or certification, and fail to follow proper use of implements and disinfection procedures. Therefore, there is a need to provide safe and standardized services to the public, and to set such expectations for the professionals that serve them, through transparency of the industry and education of the public.

An aspect of some embodiments of the invention provides an Interactive Directory of Professionals (IDP) system or method including an IDP engine, a directory system and a database of professionals, providing convenient access to the database and related information. An aspect of some embodiments of the invention provides computer-implemented methods, computer program products, and systems for a user accessible database directory of professionals, accessible to the public via an easy to navigate informative website, that will engage and also educate the user on the current guidelines of the industry. According to some aspect of the invention, the directory serves to recognize the professionals that are licensed and practicing according to industry standards.

An aspect of some embodiments of the invention provides an IDP method, for an end user of the IDP, including a general user and a service professional user, by storing a plurality of professional information records, wherein each professional information record relates to a service professional, receiving, from a third-party, a plurality of third-party information records, wherein each third-party information record relates to a service professional and includes licensing information for the service professional, cross-referencing a professional information record with a third-party information record, displaying a search result to an end user, in response to a search request, wherein the search result includes a list of one or more user profiles of service professionals and cross-referenced information, identifying a service professional in the returned search result, such that the service professional is identified in a visually different manner than other service professionals included in the displayed search result, and permitting the end user to edit the one or more profiles of service professionals.

An aspect of some embodiments of the invention provides an IDP system, for an end user of the IDP, including a general user and a service professional user, the system including one or more databases and one or more servers. The database may be configured for storing a plurality of professional information records, wherein each professional information record relates to a service professional. The one or more servers may be configured for receiving, from a third-party, a plurality of third-party information records, wherein each third-party information record relates to a service professional and includes licensing information for the service professional, cross-referencing a professional information record with a third-party information record, displaying a search result to an end user, in response to a search request, wherein the search result includes a list of one or more user profiles of service professionals and cross-referenced information, identifying a service professional in the returned search result, such that the service professional is identified in a visually different manner than other service professionals included in the displayed search result, and permitting the end user to edit the one or more profiles of service professionals.

An aspect of some embodiments of the invention provides a non-transitory computer readable storage medium storing a computer program product thereon, comprising instructions capable of being executed by a computer processor, performing an IDP method, for an end user of the IDP, including a general user and a service professional user, by storing a plurality of professional information records, wherein each professional information record relates to a service professional, receiving, from a third-party, a plurality of third-party information records, wherein each third-party information record relates to a service professional and includes licensing information for the service professional, cross-referencing a professional information record with a third-party information record, displaying a search result to an end user, in response to a search request, wherein the search result includes a list of one or more user profiles of service professionals and cross-referenced information, identifying a service professional in the returned search result, such that the service professional is identified in a visually different manner than other service professionals included in the displayed search result, and permitting the end user to edit the one or more profiles of service professionals.

While the present invention has been shown and described with reference to various embodiments of the present invention thereof, it will be understood by those skilled in the art that changes in form and details may be made therein without departing from the spirit and scope of the present invention as defined by the appended claims and equivalents thereof.

According to some embodiments of the invention, one or more of the methods, systems, and databases described above are configured to be stored on and accessed via a cloud platform and infrastructure. The cloud platform may operate separately from, in addition to, or in the place of a conventional server. In one variation, the cloud platform and the conventional server are in informational and command communication, such that updates to the database and systems of one are received and incorporated by the other. The cloud platform may be private, public, or a hybrid of private and public. In one variation, the conventional server and cloud platform are configured to provide updates to a shared set of websites. In another variation, the conventional server and the cloud platform each have their own dedicated website. The website may itself constitute an online, non-downloadable software and/or platform.

According to some embodiments of the invention, the website dedicated to the methods, systems, and databases operating via the cloud platform features an IP address restriction feature, with the IP address restriction feature configured to receive designated IP addresses permitted to access the website, with the designated IP addresses being added to a designated list. Upon receiving a request to access the website, the IP address restriction feature may detect the IP address associated with the request, compare the IP address with the list, and if the IP address matches a designated IP address, then permit access. The IP address restriction feature may be further configured to deny access to all IP addresses not added to the list. The IP address restriction feature may be incorporated into back-end portions of the systems, or may be navigated via a graphical user interface accessible to an administrator. In one variation, the IP address restriction feature alternately permits or denies access to the entire website. In another variation, the IP address restriction feature only denies access to a portion of the website.

According to some embodiments of the invention, the website may comprise a user interface configured to display instructional information with respect to the submission of licensing data and a field through which a document or URL containing the licensing data may be submitted or otherwise entered. The instructional information may consist of a graphical layer superimposed on the main body of the user interface and provide instructional information applied to discrete portions thereof, or may be embedded in the user interface as a single or plurality of text and/or image bodies. The instructional information may comprise a sample to indicate the form and format required or otherwise preferred for communicating the licensing data. Upon receiving the licensing data, a back-end of the website may compare the form and format of the licensing data to a template, and communicate acceptance or rejection of the licensing data to the user interface, which then communicates the status to the user. The instructional information may be configured to communicate errors or omissions in the submitted or otherwise entered licensing data directly onto the form and format of the received licensing data, or as a separate window and/or user interface portion. The licensing data may be in the form of a CSV.

According to some embodiments of the invention, the licensing data is parsed to convert the licensing data into a required or preferred format. This required or preferred format may be the same as that imposed on the user, or a format configured to be used by the back-end of the website. The licensing data may be decomposed into discrete licensing data points. The back-end is configured to access via APIs one or more governmental, official, or other third party websites or databases, including the server implemented website previously distinguished, and match each licensing data point with its licensing data point counterpart. Ideally, the licensing data point counterpart has been previously verified or supported by documentation/evidence, thereby enabling the licensing data point to be verified against its verified licensing data point counterpart. The licensing data points are listed or otherwise displayed on a verification documenting, such as a spreadsheet, with a column or portion designated for identifying the status of each licensing data point. If the licensing data point matches its counterpart, then the designated column or portion is indicated as "Active", but if there is no match, then it is indicated as "not found".

According to some embodiments of the invention, the verification document is emailed to the user initially submitting the licensing data. The verification document may be attached to the email or a link may be provided enabling the user to access the verification document online.

According to some embodiments of the invention, licensing information is obtained via disparate data sources of third parties, such as government agencies or certification bodies. The licensing information obtained from these third parties may be used to verify licensing information provided by the user of the platform described above.

In order to verify the user submitted licensing information, the licensing information obtained from the disparate data sources of third parties may first be formatted into a licensing data format suitable for storing in a licensing database. The formatted licensing data may be parsed, via computers configured to run text recognition algorithms, in order to extract key licensing data points. These key licensing data points may correspond to educational achievements or certifications pertaining to particular tasks or services, along with the jurisdictions in which those educational achievements or certifications are active. These key licensing data points may be distinguished by profession type, license type, and/or specialty type.

The licensing information submitted by users may first require pre-formatting by the user. To assist the user, the platform may provide instructional information. To licensing information may be further formatted into a licensing data format which is equivalent to the format required by the licensing database. Equivalence here may mean having each column, row, or section having a counterpart column, row, or section in the licensing database. It is possible that the licensing database has columns, rows, and sections which are not expected in the licensing information submitted by the user. These extra columns, rows, and sections may correspond to reports made by third parties, with the reports corresponding to violations committed by the user or complaints lodged against the user in the context of the services enabled by or responsibilities required by the license. The platform may predicate the recording of violations on the submitter being designated as an entity permitted and/or trusted to submit true rather than fraudulent records. The identity and/or qualifications of the of the submitter may be added to the database together with the violation records. The identity of the submitter may be confirmed via matching the submitter's IP address to a list of IP addresses associated with trusted entities, or via identity information submitted together with the violation record.

Once the licensing information is submitted by the user, its licensing data points may be compared to licensing data points in corresponding columns, rows, or sections. The system may be configured to detect matches or the lack thereof, and communicate those lack of matches to the user as well as third parties. The matching or lack thereof may also be recorded in the licensing database, subject to replacement upon receiving updates to the disparate data from the third parties or from the user.

The invention claimed is:

1. A method for mapping licenses from disparate data sources of third parties and verifying given instances of licensing data against the disparate data sources, the method comprising the steps of:
   a. formatting, by one or more computers, a plurality of third-party information records in a plurality of licensing data formats into a first uniform licensing data format;
   b. detecting the occurrence of a first plurality of licensing data points from the formatted plurality of third-party information records;
   c. providing instructional information to a user of an online platform to assist the user in submitting user licensing data to the online platform;
   d. formatting, by one or more computers, the user licensing data into a second uniform licensing data format by including fields for the second uniform licensing data format which are equivalent to or compatible with fields in the first uniform licensing data format;
   e. isolating a second plurality of licensing data points from the formatted user licensing data and comparing the second plurality of licensing data points to the first plurality of licensing data points;

f. designating licensing data points from the second plurality of licensing data points that have matching licensing data points from the first plurality of licensing data points as "matching";

g. designating licensing data points from the second plurality of licensing data points that have lack matching licensing data points from the first plurality of licensing data points as "non-matching";

h. storing, by one or more computers, the first and second plurality of licensing data points together with "matching" and "non-matching" designations in a professional information record in one or more databases.

2. The method of claim 1, with the online platform being stored on and accessible via a cloud platform.

3. The method of claim 1, additionally comprising:
   a. detecting an IP address of a user, determining whether the IP address matches an IP address on a list of IP addresses, and if not, deny access by the user to the online platform,
   b. with the list of IP addresses corresponding to users permitted to submit user licensing data.

4. The method of claim 1, with the online platform configured to receive the user licensing data via a document upload.

5. The method of claim 1, with the online platform configured to receive the user licensing data via the entry of a URL, with the URL providing access to the user licensing data.

6. The method of claim 1, additionally comprising the step of:
   a. communicating to the user via messaging or email whether or which of the licensing data points from the second plurality of licensing data points were designated as "matching" or "non-matching".

7. The method of claim 1, additionally comprising the steps of:
   a. detecting whether the user licensing data contains formatting or informational errors or omissions, and
   b. communicating to the user via messaging or email whether or which of the licensing data points contain formatting or information errors or omissions.

8. The method of claim 1, additionally comprising the step of:
   a. providing a licensing data template to the user to assist the user in pre-formatting the user licensing data prior to submission.

9. The method of claim 1, with the third-parties being a government agency or a certification body.

10. The method of claim 1, with the first and second pluralities of licensing data points includes at least one of a profession type, a license type, or a specialty type.

11. The method of claim 1, with the designation of "matching" corresponding to the user being licensed to provide a service and the designation of "unmatching" corresponding to the user being unlicensed to provide the service.

12. The method of claim 1 comprising the additional steps of:
   a. receiving violation records related to the second plurality of licensing data points, formatting the violation records into the first uniform licensing data format, and adding the formatted violation records to the first plurality of licensing data points.

13. The method of claim 12, comprising the additional steps of:
   a. verifying that the violation records are received via an IP address matching an IP address on a list of IP addresses before adding the formatted violation records to the first plurality of licensing data points;
   b. with the list of IP addresses corresponding to users approved to submit violation reports.

14. The method of claim 12, comprising the additional steps of:
   a. receiving complaint records related to the second plurality of licensing data points, formatting the complaint records into the first uniform licensing data format, and adding the formatted complaint records to the first plurality of licensing data points.

15. A non-transitory computer readable storage medium storing a computer program product thereon, comprising instructions capable of being executed by a computer processor, performing a method for mapping licenses from disparate data sources of third-parties, the method comprising:
   a. formatting, by one or more computers, a plurality of third-party information records in a plurality of licensing data formats into a first uniform licensing data format, with the third-parties being a government agency or a certification body;
   b. detecting the occurrence of a first plurality of licensing data points from the formatted plurality of third-party information records;
   c. providing instructional information to a user of an online platform to assist the user in submitting user licensing data to the online platform;
   d. providing a licensing data template to the user to assist the user in pre-formatting the user licensing data prior to submission;
   e. detecting whether the user licensing data contains formatting or informational errors or omissions;
   f. communicating to the user via messaging or email whether or which of the licensing data points contain formatting or information errors or omissions;
   g. formatting, by one or more computers, the user licensing data into a second uniform licensing data format, with the first uniform licensing data format being equivalent to or compatible with the second uniform licensing data format;
   h. isolating a second plurality of licensing data points from the formatted user licensing data and comparing the second plurality of licensing data points to the first plurality of licensing data points;
   i. designating licensing data points from the second plurality of licensing data points that have matching licensing data points from the first plurality of licensing data points as "matching";
   j. designating licensing data points from the second plurality of licensing data points that have lack matching licensing data points from the first plurality of licensing data points as "non-matching";
   k. storing, by one or more computers, the first and second plurality of licensing data points together with "matching" and "non-matching" designations in a professional information record in one or more databases;
   l. With the first and second pluralities of licensing data points includes at least one of a profession type, a license type, or a specialty type;

m. with the designation of "matching" corresponding to the user being licensed to provide a service and the designation of "unmatching" corresponding to the user being unlicensed to provide the service.

16. The method of claim 15, additionally comprising:
 a. detecting an IP address of a user, determining whether the IP address matches an IP address on a first list of IP addresses, and if not, deny access by the user to the online platform,
 b. with the first list of IP addresses corresponding to users permitted to submit user licensing data.

17. The method of claim 15, additionally comprising the step of:
 a. communicating to the user via messaging or email whether or which of the licensing data points from the second plurality of licensing data points were designated as "matching" or "non-matching".

18. The method of claim 15, with the designation of "matching" corresponding to the user being licensed to provide a service and the designation of "unmatching" corresponding to the user being unlicensed to provide the service.

19. The method of claim 15 comprising the additional steps of:
 a. receiving violation records related to the second plurality of licensing data points;
 b. verifying that the violation records are received via an IP address matching an IP address on a second list of IP addresses;
 c. formatting the violation records into the first uniform licensing data format;
 d. adding the formatted violation records to the first plurality of licensing data points;
 e. receiving complaint records related to the second plurality of licensing data points;
 f. formatting the complaint records into the first uniform licensing data format;
 g. adding the formatted complaint records to the first plurality of licensing data points.

20. The method of claim 19, comprising the additional step of:
 a. transmitting violation records to the third parties.

* * * * *